(12) United States Patent
Chandak

(10) Patent No.: US 9,137,032 B2
(45) Date of Patent: Sep. 15, 2015

(54) SPECIFYING DESIRED LIST OF RECIPIENTS IN ELECTRONIC MAILS

(71) Applicant: Oracle International Corporation, Redwood Shores, CA (US)

(72) Inventor: Anand Chandak, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 326 days.

(21) Appl. No.: 13/632,169

(22) Filed: Oct. 1, 2012

(65) Prior Publication Data

US 2014/0095628 A1    Apr. 3, 2014

(51) Int. Cl.

| | |
|---|---|
| *G06F 15/16* | (2006.01) |
| *H04L 12/18* | (2006.01) |
| *H04L 12/58* | (2006.01) |
| *G06Q 10/10* | (2012.01) |
| *H04L 29/06* | (2006.01) |

(52) U.S. Cl.
CPC .......... *H04L 12/1859* (2013.01); *G06Q 10/107* (2013.01); *H04L 51/14* (2013.01); *H04L 29/06* (2013.01)

(58) Field of Classification Search
CPC ...... G06Q 10/107; G06Q 10/10; H04L 51/14; H04L 12/58; H04L 51/28
See application file for complete search history.

(56) References Cited

U.S. PATENT DOCUMENTS

| | | | |
|---|---|---|---|
| 8,577,970 B2 * | 11/2013 | Hogan et al. | 709/206 |
| 2002/0129111 A1 | 9/2002 | Cooper | |
| 2006/0004843 A1 | 1/2006 | Tafoya et al. | |
| 2008/0016168 A1 * | 1/2008 | Noonan et al. | 709/206 |
| 2008/0295000 A1 * | 11/2008 | Kieselbach et al. | 715/752 |
| 2009/0157828 A1 * | 6/2009 | Agrawal | 709/206 |
| 2010/0185677 A1 | 7/2010 | Gupta et al. | |
| 2011/0075191 A1 | 3/2011 | Meunier et al. | |
| 2011/0093489 A1 | 4/2011 | Gawor et al. | |
| 2011/0093552 A1 * | 4/2011 | Thomas et al. | 709/206 |
| 2011/0145336 A1 * | 6/2011 | Carroll | 709/206 |
| 2013/0167043 A1 * | 6/2013 | Yach et al. | 715/753 |
| 2013/0198306 A1 * | 8/2013 | Macwan et al. | 709/206 |

OTHER PUBLICATIONS

Creating Contact Groups, http://support.google.com/mail/bin/answer.py?hl=en&answer=30970, Downloaded circa Mar. 16, 2012, pp. 1-1.

Dynamic Email Address Based on Pulldown Value, http://acrobatusers.com/forum/javascript/dynamic-email-address-based-pulldown-value/, Downloaded circa Mar. 16, 2012, pp. 1-1.

"Heinz Tschabitscher", How to Create an Address Book Group for List Mailing in Mac Os X Mail, http://email.about.com/od/macosxmailtips/qt/Create_an_Address_Book_Group_for_List_Mailing_in_OS_X_Mail.htm, Downloaded circa Mar. 16, 2012, pp. 1-1.

(Continued)

*Primary Examiner* — Djenane Bayard
(74) *Attorney, Agent, or Firm* — Iphorizons PLLC; Narendra Reddy Thappeta

(57) ABSTRACT

Specifying desired list of recipients in electronic mails. According to an aspect, a digital processing system receives a criteria for determining the recipients of an email communication, and in response queries an enterprise data store to identify a set of recipients matching the received criteria. The digital processing system then forwards the email communication to the identified set of recipients. In one embodiment the digital processing system is an email server and in another embodiment is a end user system, used by a user to compose the email communication.

9 Claims, 6 Drawing Sheets

(56) References Cited

OTHER PUBLICATIONS

"STEVENSPARK", How to Dynamically Set the Recipient (To) Email Address in Contact Form 7, http://sevenspark.com/tutorials/how-to-dynamically-set-the-recipient-to-email-address-in-contact-form-7, Jan. 21, 2011, pp. 1-3.

Process Dynamic Email Addresses Using Python, http://stackoverflow.com/questions/5475540/process-dynamic-email-addresses-using-python, Downloaded circa, Mar. 16, 2012, pp. 1-2.

"Jonathan B. Postel", Simple Mail Transfer Protocol, RFC 821, Aug. 1982, pp. 1-77.

Yahoo! Groups, http://groups.yahoo.com/, Downloaded circa, Mar. 16, 2012, pp. 1-1.

* cited by examiner

SPECIFYING DESIRED LIST OF RECIPIENTS IN ELECTRONIC MAILS

BACKGROUND OF THE INVENTION

1. Technical Field

The present disclosure relates to electronic mail systems, and more specifically to specifying desired list of recipients in electronic mails.

2. Related Art

Electronic mail (email) is often used for communicating messages. A sender addresses each email to one or more recipients, and the corresponding message is delivered to each of the addressed recipients. Such delivery usually entails forwarding the message to be eventually stored associated with an account of the addressed recipient such that the recipient can later conveniently access the messages from the account. The account represents the email address of the recipient, and is used by the sender to address that recipient, as is well known in the relevant arts.

Senders often wish to send a single email to a list of recipients. For example, a manager may wish to send an email to all employees of a specific department at a given location. It is desirable that the manager (or senders in general) be able to conveniently specify desired list of recipients in such (or other) situations.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

According to an aspect of the present invention, a digital processing system receives a criteria for determining the recipients of an email communication, and in response queries an enterprise data store to identify a set of recipients matching the received criteria. The digital processing system then forwards the email communication to the identified set of recipients.

In one embodiment the digital processing system is an email server and in another embodiment is an end user system, used by a user to compose the email communication.

By facilitating senders of email communications to specify desired criteria for recipients, the senders are enabled to specify desired lists of recipients in electronic mails.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
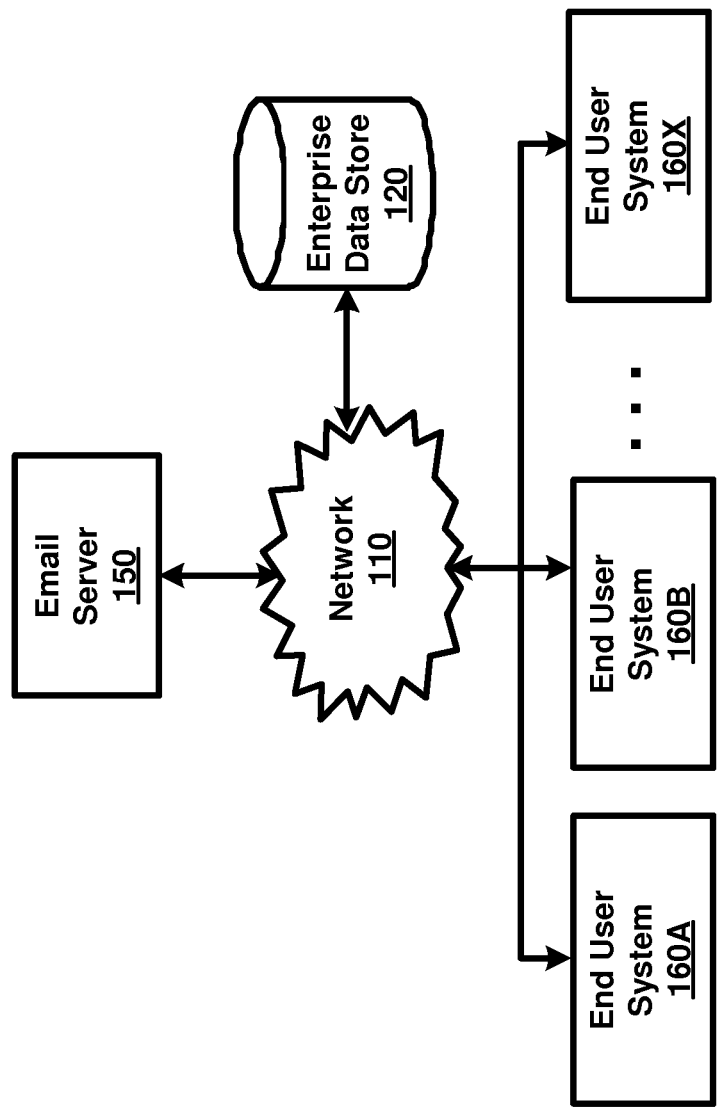
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing network 110, enterprise data store 120, electronic mail (email) server 150 and end user systems 160A-160X.

Merely for illustration, only representative number/type of systems is shown in FIG. 1. Many environments often contain many more systems, both in number and type, depending on the purpose for which the environment is designed. Each system/device of FIG. 1 is described below in further detail.

Network 110 provides connectivity between enterprise data store 120, email server 150 and end user systems 160A-160X, and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by network 110.

Enterprise data store 120 represents a non-volatile (persistent) storage facilitating storage and retrieval of data by applications executing in server systems such as email server 150. In one embodiment, enterprise data store 120 represents a directory server that facilitates the information related to an enterprise such as employees, resources, organizational units, etc. to be maintained in a logical/hierarchical manner. The directory server also maintains details such as the name, title, location, department, email address, etc. of each of the employees in the enterprise. The information maintained in the directory server may thereafter be accessed using protocols such as lightweight directory access protocol (LDAP) well known in the relevant arts.

In an alternative embodiment, enterprise data store 120 may be implemented as a database server according to relational database technologies and accordingly provide storage and retrieval of data using structured queries such as SQL (Structured Query Language). For example, enterprise database 120 may be implemented using Oracle Database 11 g available from Oracle Corporation, the intended assignee of the present invention.

Each of end user systems 160A-160X represents a system such as a personal computer, workstation, mobile station, mobile phone, computing tablet, etc., used by a user to send and receive email communications to/from other users. In general, a user/sender sends (using one of end user systems 160A-160X) an email communication addressed to one or more recipients to email server 150, which in turn forwards the email communication to the intended recipients (as described in detail below). Each user/recipient then receives (using the same or another one of end user systems 160A-160X) the email communication addresses to the recipient from email server 150. The senders/recipients may use appropriate user interfaces (for example, web pages provide by email server 150) to send and receive email communications.

Alternatively, each end user system may execute email client software, such as Microsoft Outlook 2010 available from Microsoft Corporation, Mozilla Thunderbird 15.0 available from Mozilla Foundation, etc. that facilitates users to send and receive email communications. The client software may be configured with an identifier (generally, the email address) of a corresponding user, an incoming mail server (from which received emails are to be retrieved) and an outgoing mail server (to be used for sending messages). In the following disclosure, both the incoming and outgoing mail servers are assumed to be configured to (appropriate incoming/outgoing server identifiers of) email server 150.

Email server 150 represents a server system that facilitates users to send and receive email communications using one of end user systems 160A-160X. Email server 150 may operate as one of (or both of) an incoming mail server and outgoing mail server. When operating as an outgoing mail server, email server 150 inspects the mail header in a received email communication to determine the specific target machine to send to (using technologies such as Domain Name Server or internal configured files), and then delivers the email communications to the determined target machine. When operating as an incoming mail server, email server 150 stores received email communications directed to a user/recipient in an associated account (storage). Each user may later view/retrieve the email communications stored in an associated account using appropriate user interfaces (web pages) or using compatible email client software (noted above).

As noted in the Background sections, senders of email communications often wish to send an email communication to a list of recipients. Email server 150, provided according to several aspects of the present invention, facilitates a sender to specify desired list of recipients in email communications as described below with examples.

3. Specifying Desired List of Recipients

Figure 2:
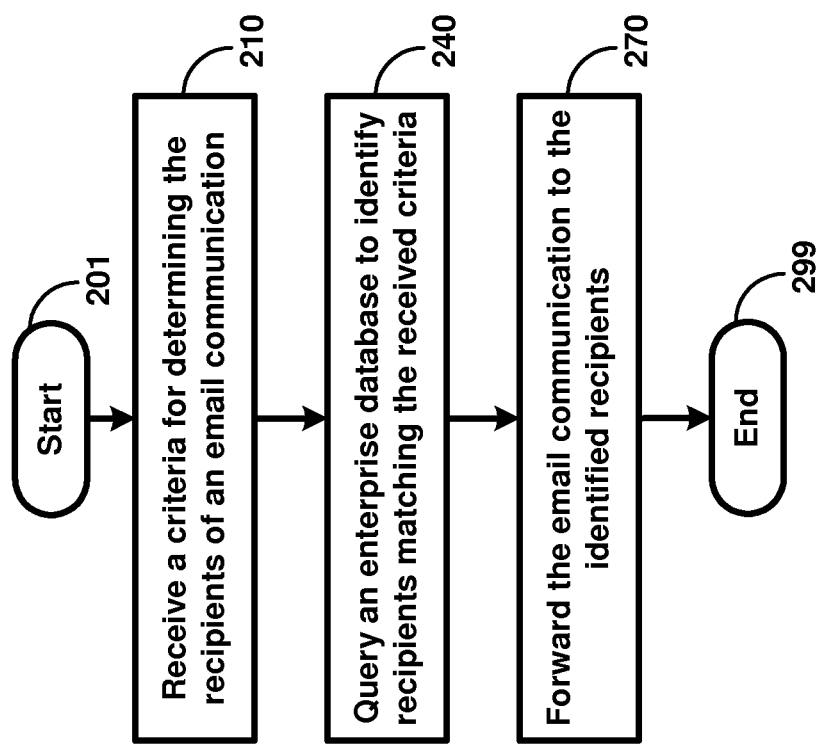
FIG. 2 is a flowchart illustrating the manner in which a sender (of an email) is facilitated to specify desired list of recipients according to several aspects of the present invention.

FIG. 2 is a flowchart illustrating the manner in which a user is facilitated to specify desired list of recipients in electronic mails (emails) according to an aspect of the present invention. The flowchart is described with respect to FIG. 1, and in relation to email server system 150 merely for illustration. However, the features can be implemented in other environments (and in other servers) also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, email server 150 receives a criteria for determining the recipients of an email communication. The criteria may be contained in a recipient address field (e.g., TO, CC, BCC fields) of the email communication. The criteria necessarily contains a pre-defined field, a comparison operator (e.g., less than, equal to, membership operator such as "in") and a set of (one or more) values.

In step 240, email server 150 queries enterprise data store 120 to identify recipients matching the received criteria. Such querying may entail sending one or more requests specifying the criteria, consistent with the interface requirements of enterprise data store 120. For example, assuming enterprise data store 120 is implemented using relational database technology, the requests may contain the criteria according to SQL format.

In step 270, email server 150 forwards the email communication to the identified recipients. Forwarding eventually results in the email communication being stored in the respective accounts (on email server 150 or other external email servers) of the identified recipients, as noted above in the Background Section. The flow chart ends in step 299.

It may be readily appreciated that the features described above provide a more flexible approach to senders for specifying desired list of recipients, suitable for the corresponding situation. Such flexibility ensures that the sender is not limited to any type of pre-specified email lists (e.g., distribution lists, mailing lists, aliases), but rather the sender can take advantage of the organization of data in an enterprise data store (such as 120).

The manner in which email server 150 facilitates users to specify desires lists of recipients in email communications, according to the steps of FIG. 2 is described below with examples.

4. Illustrative Example

FIGS. 3A-3C and 4 together illustrate the manner in which a sender of an email communication is facilitated to specify desired list of recipients in one embodiment. The description is continued assuming that the sender/user is using the email client software Microsoft Outlook 2010 (noted above) executing in end user system 160A to send an email communication. However, the features of the present invention may be provided by other email client software, web page based user interfaces, etc. executing on any system (e.g. end user systems 160B-160X) used by a sender/user to send email communications, as will be apparent to one skilled in the relevant arts, by reading the disclosure herein. Each of the Figures is described in detail below.

Figure 3A:
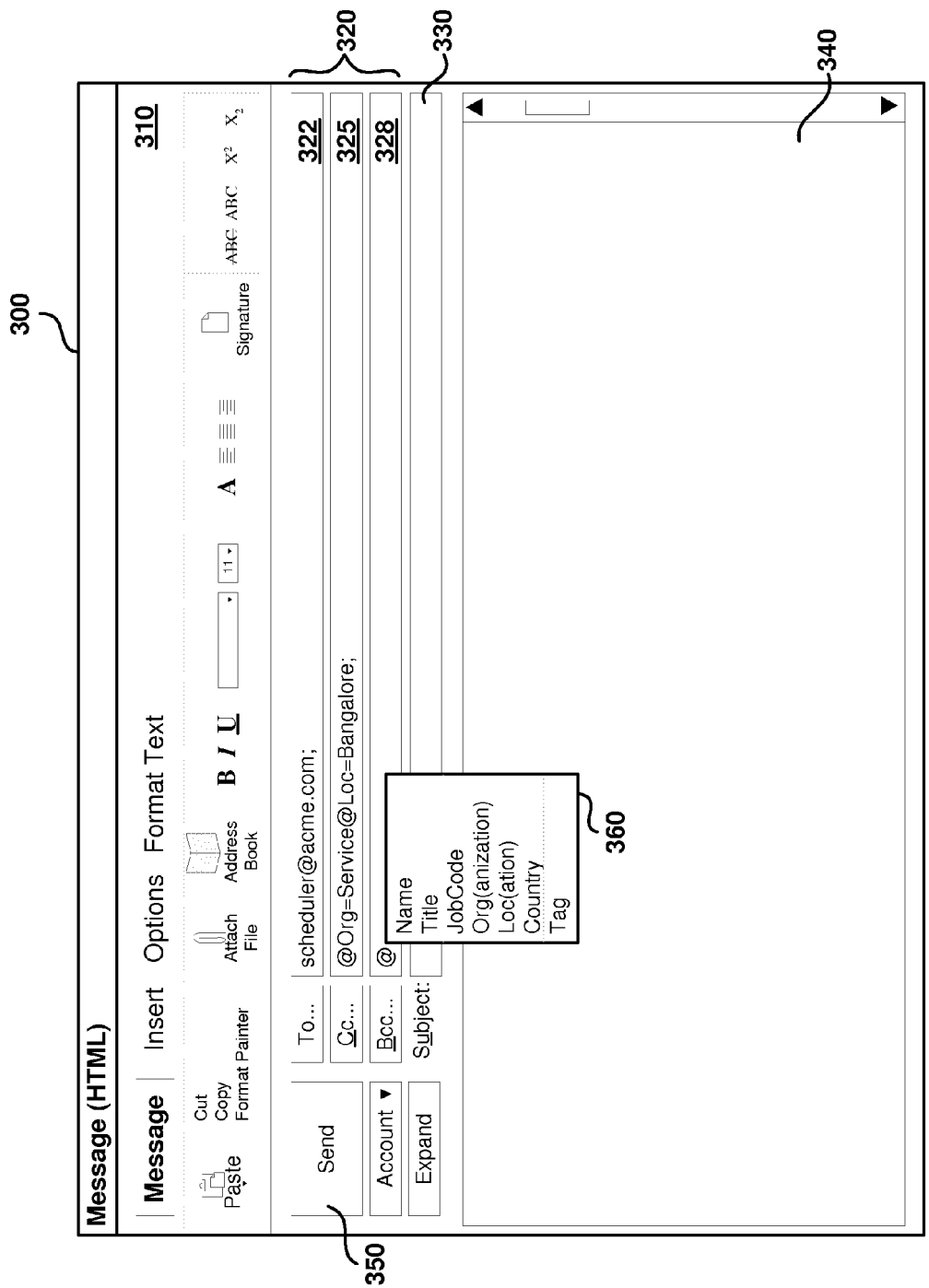
FIG. 3A depicts the manner in which a sender composes (and later sends) a new email communication in one embodiment.

FIG. 3A depicts the manner in which a sender composes (and later sends) a new email communication in one embodiment. Display area 300 depicts a portion of a user interface provided on a display unit (not shown in FIG. 1) associated with end user system 160A. The user interface is assumed to be displayed by the email client software, in response to an indication (for example, clicking a "New" button) that the user/sender desires to compose and send a new email communication.

Display area 310 provides various options to the sender for composing the email communication such as attaching files, selecting one or more recipients from an address book, formatting the text of the email communication, adding a predefine signature, etc. Display area 320 depicts TO, CC, and BCC fields (hereafter referred to as "address fields") in which the sender is enabled to specify the email addresses of the recipients. Display area 330 depicts a subject field in which the sender may specify a subject line for the email communication. Display area 340 enables the sender to specify any desired text (and to format it using the options shown in display area 310) to be sent as the message in the email communication.

It may be appreciated that a sender may specify the desired recipients in the address fields by entering (using a keyboard and/or a mouse) the email address of a recipient or by selecting the recipient from the address book. Address (TO) field 322 indicates that the user has specified the email address "scheduler@acme.com" of one of the recipients. However, specifying a list of recipients in such a manual manner may not be feasible (for a very large number of recipients) or desirable (due to the time required).

An aspect of the present invention facilitates a sender to specify any desired criteria for determining the recipients of an email. As such, the criteria "@Org=Service@Loc=Bangalore" in address (CC) field 325 indicates that the email communication is to be sent to all users (recipients) matching the specified criteria. It may be observed that the criteria contains one or more conditions, each condition starting with the ampersand character "@" and containing a pre-defined field (such as "Org", "Loc", etc.), a comparison operator (such as equal to "=") and a corresponding value (such as "Service" and "Bangalore").

It may be appreciated that the pre-determined fields represent corresponding data elements stored in enterprise data store 120. Accordingly, it may be desirable that the list of pre-defined fields specific to (based on the data elements maintained in) enterprise data store 120 be made available to the sender.

In one embodiment, the list of pre-defined fields is displayed in response to receiving (from the sender) an indication that the sender desires to specify the criteria in an address field (325). The indication may be provided by the sender clicking/selecting an option in display area 310 or by pressing a pre-defined key. For example, the sender may enter the ampersand character ("@") at the beginning of the email address (in contrast to entering the ampersand as part of (in the middle of) an email address) to provide the indication.

Display area 360 depicts a list of pre-defined fields that may be displayed (by the email client software) to the sender in response to the above noted indication. The list of pre-defined fields may be pre-configured (by the sender/user or by an administrator) in the email client software, or may be downloaded from email server 150 (at regular intervals or in response to the indication).

A user/sender may select the desired pre-defined fields from the list shown in display area 360, and then enter the desired conditions and corresponding values in the address field (325) to build the desired criteria. After finishing the composing of the email communication, the sender clicks/selects the "Send" button 350 to send the newly composed email communication.

In response to the sender selecting the "Send" button, the email client software sends the email communication to the outgoing mail server, that is, email server 150 based on the configuration. The email communication including the recipient email addresses and the criteria specified in the address fields are sent to email server 150 according to the Simple Mail Transfer Protocol (SMTP), described in detail in RFC 821. The manner in which such an email communication with criteria specified in the address fields is processed by email server 150 is described below with examples.

5. Processing Email Communications with Criteria

Broadly, in response to receiving an email communication with a criteria, email server 150 first determines the users/recipients matching the received criteria by querying enterprise data store 120. As noted above, querying may entail sending one or more requests specifying the criteria, consistent with the interface provided by enterprise data store 120. The description is continued assuming that enterprise data store 120 is a directory server storing the information related to the enterprise in a logical/hierarchical manner.

Figure 4:
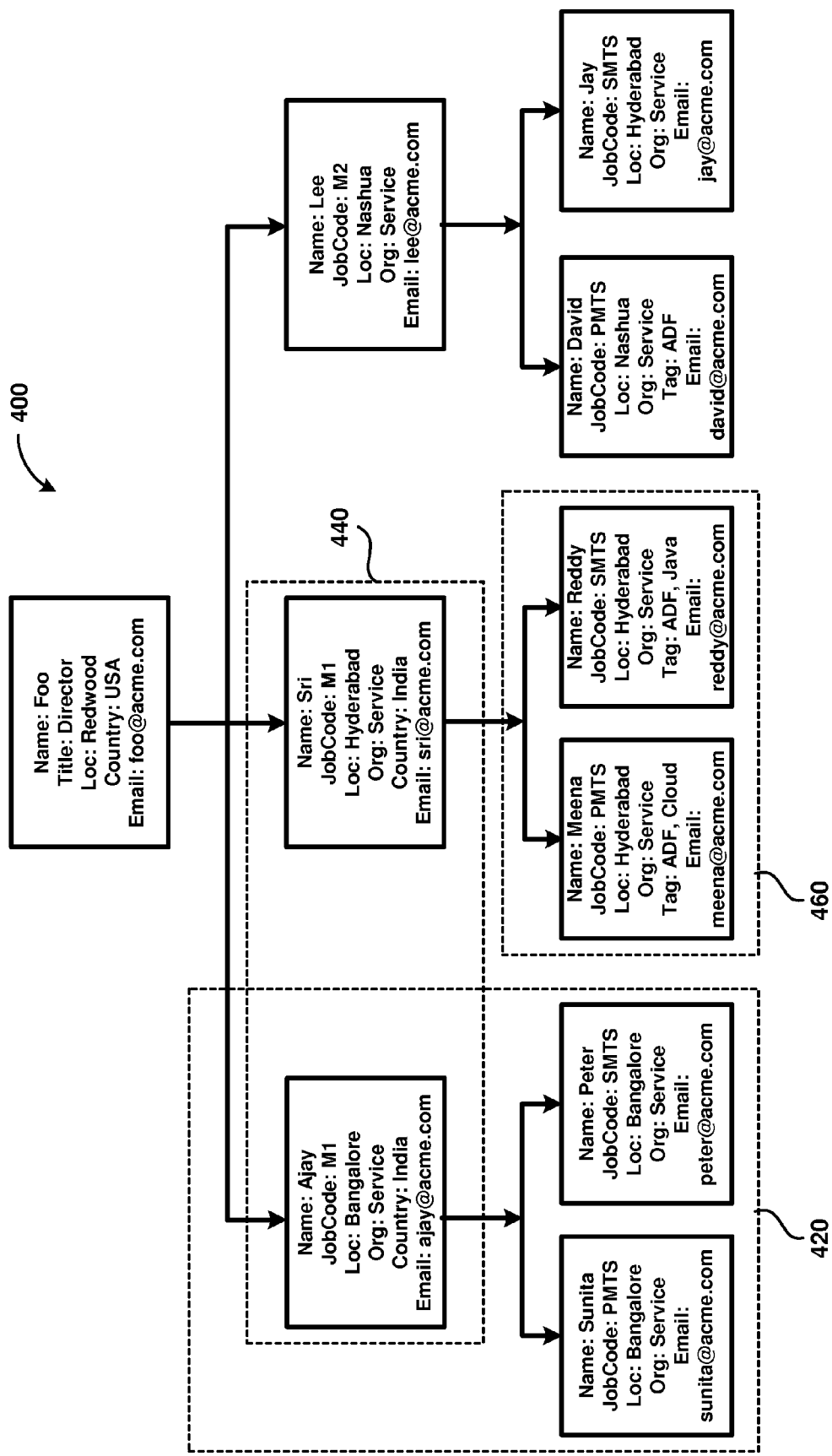
FIG. 4 illustrates the manner in which information related to an enterprise is stored in an enterprise data store in one embodiment.

FIG. 4 illustrates the manner in which information related to an enterprise is stored in an enterprise data store (120) in one embodiment. Hierarchal model 400 is shown containing various nodes (commonly referred to as objects) corresponding to different employees of the enterprise. In particular, each node is shown containing various attributes such as the name, title, loc (location), org (organization), jobcode, country, etc. and respective values for the corresponding employee. Some of the nodes are also shown containing a tag attribute associated with one or more values such as ADF, Cloud, etc.

It should be noted that the names of the attributes in hierarchical model 400 are shown to be same as the (names of the) pre-determined fields noted above, merely for convenience. In alternative embodiments, the names of the attributes (used in hierarchical model 400) and pre-defined fields (used for specifying criteria in the address fields of email communications) may be different, with email server 150 designed to maintain a mapping between the pre-defined fields and corresponding attributes.

The nodes and the corresponding information may be accessed by sending requests according to LDAP protocol. As is well known, a directory (search) request contains an identifier of a node in the hierarchical model 400 under which the values are to be retrieved, a number of levels in the hierarchy from which the values are to retrieved and a criteria that has to be satisfied by the retrieved values.

Thus, in response to receiving the criteria "@Org=Service@Loc=Bangalore" shown in address (CC) field 325, email server 150 generates a LDAP request containing the identifier as "title=Director" (indicating the root node in model 400), the number of levels as "subtree" (indicating all levels below the root node) and the search criteria as "(&(Org=Service)(Loc=Bangalore))" (indicating that entries having the attribute "Org" set to value "Service", and the attribute "Loc" set to value "Bangalore" are to be retrieved). In the scenario that email server 150 maintains mapping between pre-defined fields and attributes of model 400, email server 150 constructs the search criteria by replacing each occurrence of a pre-defined field with the corresponding mapped attribute. Email server 150 then sends the LDAP request to enterprise data store 120.

In response to receiving the LDAP request noted above, enterprise data store 120 determines that only the three nodes shown within the dotted boundary 420 have the organization attribute "Org" set to Service and the location attribute "Loc" set to Bangalore. Enterprise data store 120 accordingly sends the identified set of three nodes (having the names "Ajay", "Sunita" and "Peter") as a response to the LDAP request. The response may include all the information associated with each node. In an alternative embodiment, only the email addresses in the three nodes may be included in the response.

Email server 150, upon receiving the response from enterprise data store 120, identifies that the employees/nodes in the response represent the intended recipient. Email server 150 accordingly includes the email addresses ajay@acme.com, sunita@ame.com, and peter@acme.com of the three employees in the address field (possibly the same field in which the criteria was specified) of the email communication. Email server 150 then forwards the received email communication to the newly identified recipients (in addition to any recipients already specified in the address fields of the email communication).

Email server 150 may similarly process other criteria specified in the same (or other) email communications. For example, in response to the criteria "@Org=Service@JobCode=M1@Country=India", email server 150 may forward the email communication to the employees named "Ajay" and "Sri", corresponding to the nodes satisfying the criteria shown within dotted boundary 440. Thus, email server 150 facilitates the senders of email communication to specify desired lists of recipients by using the appropriate criteria.

An aspect of the present invention facilitates the user to exclude a specific user/employee from being a recipient of an email communication. For example, a sender may specify a criteria such as "@tag=ADF@name<>David" (where "<>" represents the "not equal to" operator), with email server 150 accordingly identifying only the employees named "Meena" and "Reddy" (corresponding to the nodes shown within dotted boundary 460) as the recipient of the email communication. The employee named "David" is not determined as a recipient due to the not equal to condition specified in the criteria.

Such exclusion of specific users may be desirable in certain situations. For example, the employees of the ADF team may wish to buy a surprise birthday gift for "David", and may accordingly wish to exclude David from receiving any communications related to the gift. It may be appreciated that such an exclusion feature may not be possible to achieve using pre-specified email lists (e.g., distribution lists, mailing lists, aliases).

Thus, email server 150 facilitates senders to specify desired lists of recipients in email communications. Though the above description is with respect to an email server, it should be appreciated that several features of the present invention may also be provided by an end user system (such as 160A-160X) used by a sender for composing the email communications, as described below with examples.

6. Processing Criteria in End User Systems

Figure 3B:
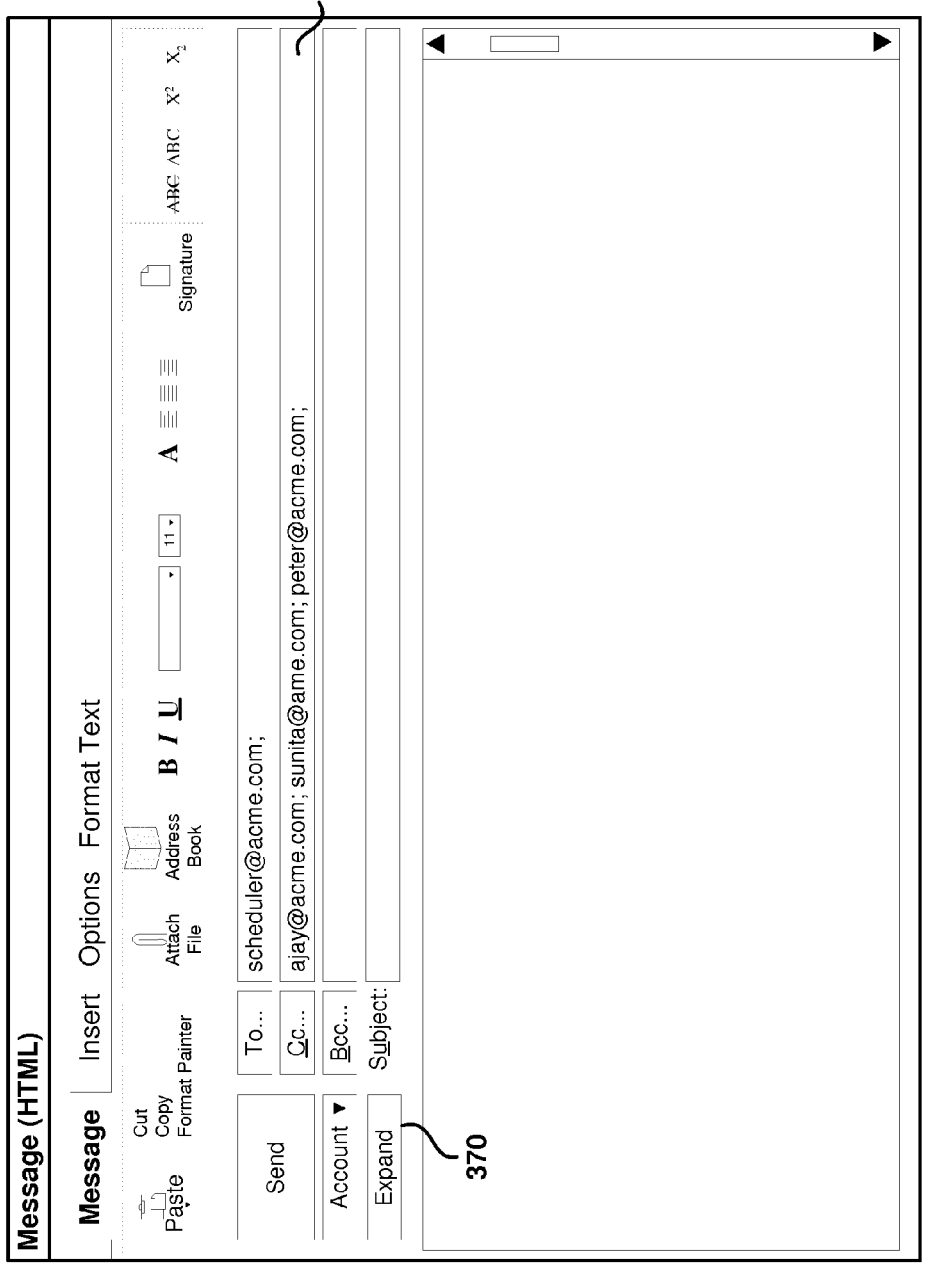
FIG. 3B illustrates the manner in which a criteria specified by a sender is processed during composing of a new email communication in one embodiment.

FIG. 3B illustrates the manner in which a criteria specified by a sender is processed (in an end user system such as 160A-160X) during composing of a new email communication in one embodiment. The user interface of FIG. 3B is similar to the interface shown in FIG. 3A, and accordingly the description of the individual elements is not repeated here for conciseness.

As noted above, display area 300 of FIG. 3B is assumed to be provided by end user system 160A, and accordingly the processing of the criteria in end user system 160A is described in detail below.

A sender after specifying the criteria ""@Org=Service@Loc=Bangalore" in address (CC) field 325 of FIG. 3A, may then click/select "Expand" button 370 instead of "Send" button 350. In response to the user selecting "Expand" button 370, the email client software executing in end user system 160A may be designed to send the criteria to email server 150, which in turn queries enterprise data store 120 for the email addresses of the matching recipients.

Alternatively, the email client software may be designed to query enterprise data store 120 directly (by sending one or more requests containing the criteria consistent with the interface of enterprise data store 120) and receive the email address of the recipients from enterprise data store 120. Thus, in the scenario that enterprise data store 120 is a directory server, end user system 160A may send requests according to LDAP protocol, similar to the requests sent by email server 150 described above.

Upon receiving the response with the email addresses (either from email server 150 or enterprise data store 120), the email client software executing in end user system 160A may replace the criteria in the address (CC) field with the email addresses ajay@acme.com, sunita@ame.com and peter@acme.com of the matching recipients (for the data shown in hierarchy 400 of FIG. 4). The output of such replacement is shown in address field 385. The sender may thereafter click/select "Send" button 350 to send the email communication to the newly identified recipients as well.

Thus, an end user system (such as 160A) facilitates senders to specify the desired list of recipients in email communications. It may be appreciated that the end user system may also facilitate the sender to exclude one or more users, similar to the manner described above with respect to email server 150.

It should be further appreciated that the features described above can be implemented in various embodiments as a desired combination of one or more of hardware, executable modules, and firmware. The description is continued with respect to an embodiment in which various features are operative when corresponding executable modules are executed.

7. Digital Processing System

Figure 5:
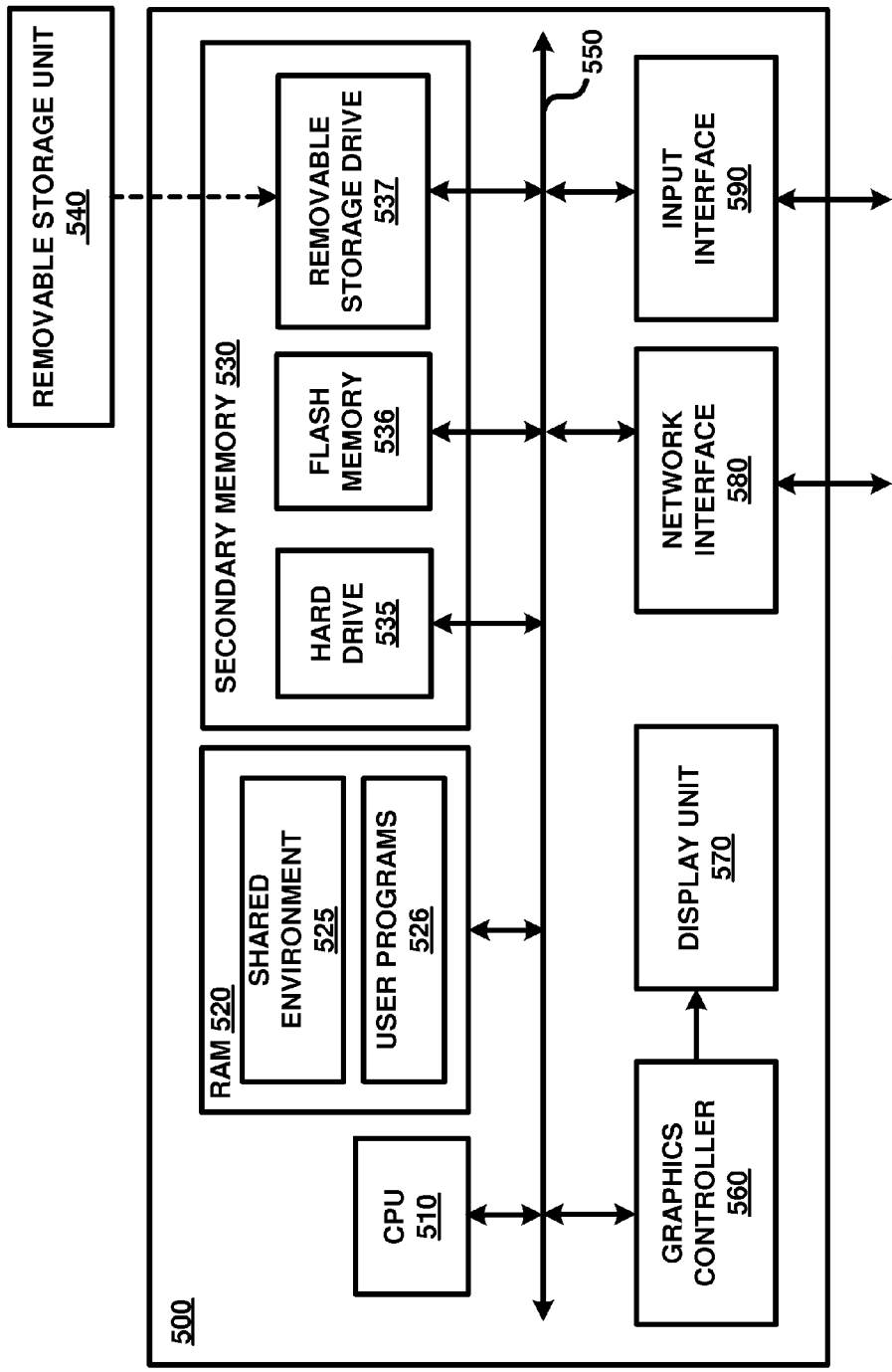
FIG. 5 is a block diagram illustrating the details of a digital processing system in which several aspects of the present invention are operative by execution of appropriate executable modules.

FIG. 5 is a block diagram illustrating the details of digital processing system 500 in which several aspects of the present invention are operative by execution of appropriate executable modules. Digital processing system 500 may correspond to email server 150 or any one of end user systems 160A-160X.

Digital processing system 500 may contain one or more processors (such as a central processing unit (CPU) 510), random access memory (RAM) 520, secondary memory 530, graphics controller 560, display unit 570, network interface 580, and input/output interface 590. All the components except display unit 570 may communicate with each other over communication path 550, which may contain several buses as is well known in the relevant arts.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting shared environment 525 and/or user programs 526. Shared environment 525 contains utilities shared by user programs, and such shared utilities include operating systems, virtual machines, etc., which provide a (common) run-time environment for execution of user programs 526 (such as browsers, email client software).

Graphics controller 560 generates display signals (e.g., in RGB format) to display unit 570 based on data/instructions received from CPU 510. Display unit 570 contains a display screen to display the images defined by the display signals (for example, portions of the user interface shown in FIGS. 3A and 3B). Input/output interface 590 includes input as well as output devices to enable a user to interact with system 500

(for example, to interact with the user interface of FIGS. 3A and 3B). Network interface 580 provides the physical, electrical and protocol implementations that enable system 500 to communicate with other systems using protocols such as TCP/IP.

Secondary memory 530 (representing a non-transitory storage/medium) may contain hard drive 535, flash memory 536, and removable storage drive 537. Secondary memory 530 may store data and software instructions (for example, for performing the steps of FIG. 2), which enable digital processing system 500 to provide several features in accordance with the present invention, as described above.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 530. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of processing email communications, said method being performed in an end user system, said method comprising:

receiving, in said end user system, a criteria for determining the recipients of an email communication while said email communication is composed at said end user system, wherein said criteria comprises one or more conditions, each condition containing a pre-defined field, a conditional operator and a set of values;

identifying in said end user system, a set of recipients matching said criteria by sending a query specifying said criteria and receiving email identifiers of said recipients as a response, wherein an enterprise data store maintains information on a plurality of users of an enterprise, wherein said query is processed by said enterprise data store to generate information representing said set of recipients by processing said criteria, wherein said enterprise data store includes a user in said set of recipients only if the information of said user matches said one or more conditions, wherein said end user system sends said query to said email server, which in turn forwards said query to said enterprise data store to cause said criteria to be processed by said enterprise data store, wherein said information is thereafter forwarded to said end user system, said set of recipients being contained in said plurality of users, said information containing an email address of each of said set of recipients to represent the corresponding user; and forwarding from said end user system to said email server, said email communication containing said email identifiers to specify that said email communication is to be delivered to said set of recipients.

2. The method of claim 1, wherein said criteria comprises a condition indicating that a first user is not to be included in said set of recipients, wherein said enterprise data store does not include said first user in said set of recipients users such that said digital processing system does not forward said email communication to said first user, whereby a sender of said email communication is enabled to exclude said first user from receiving said email communication.

3. The method of claim 1, wherein said end user system replaces said criteria with said email address of each of said set of recipients prior to said forwarding.

4. A non-transitory machine readable medium storing one or more sequences of instructions for causing an end user system to process email communications, wherein execution of said one or more instructions by one or more processors contained in said end user system causes said end user system to perform the actions of:

receiving a criteria for determining the recipients of an email communication while said email communication is composed at said end user system, wherein said criteria comprises one or more conditions, each condition containing a pre-defined field, a conditional operator and a set of values;

identifying in said end user system, a set of recipients matching said criteria by sending a query specifying said criteria and receiving email identifiers of said recipients as a response, wherein an enterprise data store maintains information on a plurality of users of an enterprise, wherein said query is processed by said enterprise data store to generate information representing said set of recipients by processing said criteria, wherein said enterprise data store includes a user in said set of recipients only if the information of said user matches said one or more conditions, wherein said end user system sends said query to said email server, which in turn forwards said query to said enterprise data store to cause said criteria to be processed by said enterprise data store, wherein said information is thereafter forwarded to said end user system, said set of recipients being contained in said plurality of users, said information containing an email address of each of said set of recipients to represent the corresponding user; and forwarding from said end user system to said email server, said email communication containing said email identifiers to specify that said email communication is to be delivered to said set of recipients.

5. The non-transitory machine readable medium of claim 4, wherein said criteria comprises a condition indicating that a first user is not to be included in said set of recipients, wherein said enterprise data store does not include said first user in said set of recipients such that said digital processing system does not forward said email communication to said first user, whereby a sender of said email communication is enabled to exclude said first user from receiving said email communication.

6. The non-transitory machine readable medium of claim 4, wherein said end user system replaces said criteria with said email address of each of said set of recipients prior to said forwarding.

7. A computing system comprising:

an enterprise data store to maintain information on a plurality of users of an enterprise, said information containing an email address of each of said plurality of users;

an email server containing at least a processor and a memory, said memory to store a plurality of instructions; and an end user system operable to receive a criteria while an email communication is composed at said end user system, said end user system to thereafter send said criteria to said email server, wherein said criteria comprises one or more conditions, each condition containing a pre-defined field, a conditional operator and a set of values;

said processor for retrieving and executing said plurality of instructions, wherein execution of said plurality of instructions by said processor causes said email server, upon receiving said criteria, to:

query said enterprise data store to determine said email address of each of a set of users matching said criteria, wherein said enterprise data store includes a user in a set of recipients only if the information of said user matches said one or more conditions;

send, as a response to said request, said email address of each of said set of recipients to said end user system, whereby said end user system identifies said set of users matching said criteria by sending said query specifying said criteria and receiving said email addresses of each of said set of recipients as a response;

said end user system, upon receiving said email addresses of each of said set of recipients as said response, is further operable to forward to said email server, said email communication containing said email addresses to specify that said email communication is to be delivered to said set of recipients, wherein said email server receives said email communication and forwards said email communication to said set of recipients based on said email addresses.

8. The computing system of claim 7, wherein said criteria comprises a condition indicating that a first user is not to be included in said set of recipients, wherein said enterprise data store does not include said first user in said set of recipients, wherein said email server does not forward said email communication to said first user, whereby said sender of said email communication is enabled to exclude said first user from receiving said email communication.

9. The computing system of claim 7, wherein said enterprise data store is a directory server, wherein said one or more requests are sent according to lightweight directory access protocol (LDAP).

* * * * *

UNITED STATES PATENT AND TRADEMARK OFFICE
CERTIFICATE OF CORRECTION

PATENT NO.         : 9,137,032 B2
APPLICATION NO.    : 13/632169
DATED              : September 15, 2015
INVENTOR(S)        : Chandak Page 1 of 1

It is certified that error appears in the above-identified patent and that said Letters Patent is hereby corrected as shown below:

In The Specification

In column 7, line 59, delete """@Org" and insert -- "@Org --, therefor.

In the Claims

In column 10, line 53, in claim 2, after "recipients" delete "users".

Signed and Sealed this
Twenty-third Day of August, 2016

Michelle K. Lee
*Director of the United States Patent and Trademark Office*